Dec. 13, 1949                M. BENAZZOLI                2,491,076
                           PROPULSION OF CYCLES
                           Filed March 23, 1946
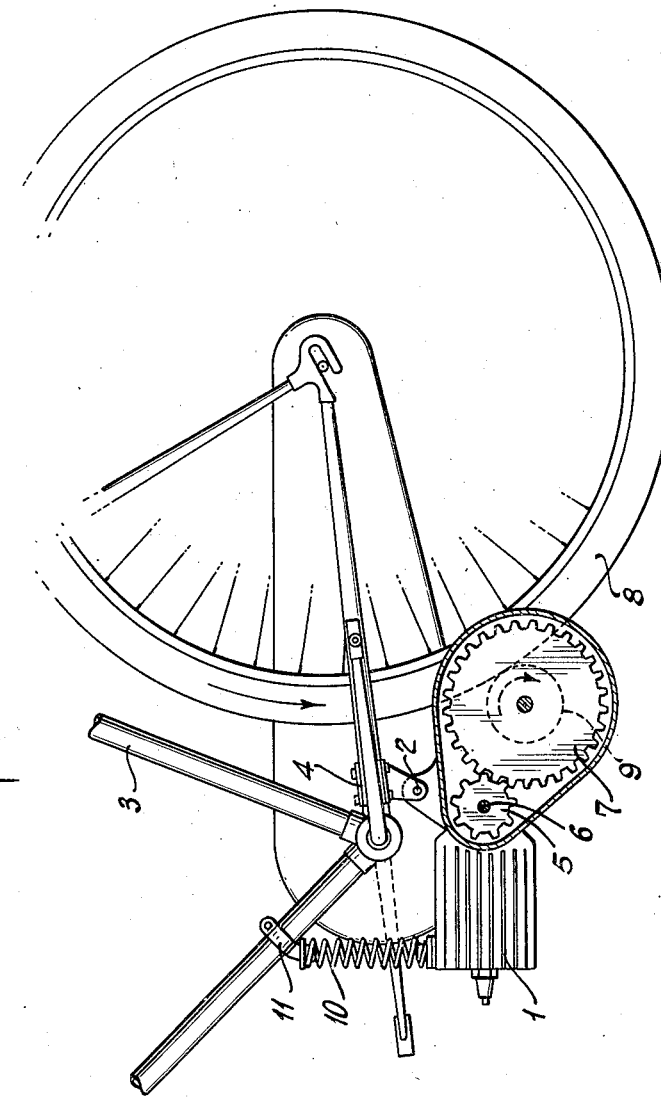
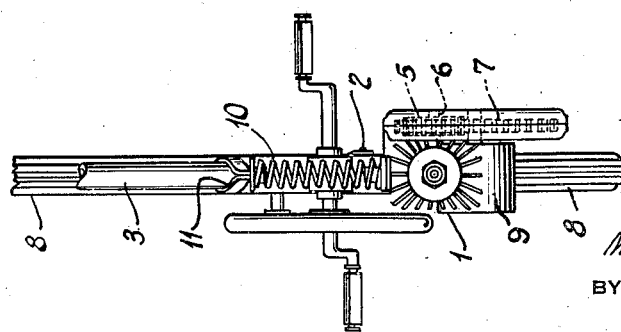
INVENTOR:
MARIO BENAZZOLI.
BY K. B. Mayr
ATTORNEY Patented Dec. 13, 1949

2,491,076

UNITED STATES PATENT OFFICE 2,491,076

PROPULSION OF CYCLES

Mario Benazzoli, Milan, Italy

Application March 23, 1946, Serial No. 656,544
In Italy April 7, 1945

5 Claims. (Cl. 180—33)

The use of internal combustion engines or other motors, for instance electric motors, on bicycles for eliminating, totally or partially, the effort to be made by the rider for operating the vehicle and for improving the vehicle's efficiency, involves several problems, among which the more important are:

1. Assembly should be as easy as possible and within the capability of any inexperienced person, at all events without using any kind of special tools.
2. Application to any conventional bicycle without modifying or substituting any part of the bicycle.
3. Suspension of the engine in such manner as to guarantee that the inevitable vibrations of the engine, while running, cause no damage to the frame weldings or breaks due to fatigue.
4. Fastening of the motor in such a position that it will not suffer any damage in case of falls considering the fact that bicycles are usually left standing precariously.
5. Centering of the motor with respect to the wheel plane and keeping the center of gravity as low as possible, so as not to make riding more difficult than in an ordinary unmotorized bicycle.
6. Yielding transmission system, preferably by friction, so as to absorb shocks and to produce the same speed results on bicycles having wheels of different diameters.

In conventional arrangements, the foregoing problems are only partially solved, in the sense that, for instance, only one or several of these problems are solved to the detriment of the others.

The object of the present invention is a propulsion device by which all these problems are thoroughly solved.

The device according to the invention is assentially characterized by the fact that the motor is placed beneath the pedal crankshaft and, by means of suitable connecting elements, such as supports, tie-rods, etc., is free to oscillate on an element attached to the frame, preferably in the vicinity of the pedal crankshaft, that is of the more sturdy part of the bicycle frame.

The transmission of the rotary power is effected by driving at a suitable transmission ratio, a roller which is pressed to the periphery of the rear wheel tire. A constant contact even in the case of irregularities in the profile of the tire, as well as the pressure needed to assure frictional power transmission, are effected by a spring or other resilient means, which rests on a part of the frame.

According to a preferred embodiment of the invention, the engine, placed beneath the pedal crankshaft, has such dimensions that it fits between the planes of rotation of the pedal cranks.

The device can be easily mounted on any type of bicycle without altering in the least any part of it. The center of gravity is very low, and the weight of the engine increases the stability of the vehicle. The suspension of the engine is not rigid, due to the presence of springs or of a flexible reaction element, so that all vibrations are damped. The position is such that, should the bicycle fall, the motor is always protected.

The speed of the bicycle is independent of the wheel diameter, being only a function of the peripheral speed of the driving roller. Due to the fact that the roller is driven by the engine by means of a speed reducing transmission, it is possible to decrease its angular velocity and consequently to increase its diameter, the surface of the tire which is engaged thus decreasing the specific pressure indispensable for transmitting the driving torque, which increases the life of the tire and of the bearings.

Owing to the particular position of the roller, it is hardly possible that foreign bodies picked up by the tire from the road should be driven between the roller and the tire, since they have more time to be expelled by centrifugal force than in any other position of the roller.

For a better understanding of the invention, the attached drawing shows an embodiment of the same, which is to be understood merely as an example and has no limitative value.

In the drawing:

Fig. 1 is a side view of a portion of a bicycle equipped with an engine, according to the invention;

Fig. 2 is a front view of the matter shown in Fig. 1.

The motor 1, which in the embodiment of the invention illustrated is an internal combustion engine, but might also be an electric or any other kind of motor, is attached to pivot 2 and oscillates thereon. Pivot 2 is fastened to the frame 3 by means of the supporting plate 4. The gear wheel 5 mounted on the engine wheel shaft 6 drives, at a suitable transmission ratio, the gear wheel 7 which rotates in a plane parallel and near to the one of bicycle wheel 8.

The gear wheel 7 is fastened on roller 9 and is kept in contact with wheel 8 of the bicycle by means of spring 10, which acts by expansion. One end of the spring rests on the cylinder of the engine 1 and with its other end on the bicycle frame by means of guide 11.

It is understood that the form of the various parts of the device as well as their position may vary without departing from the scope of the invention.

Having now particularly described and ascertained the nature of my said invention and in what manner the same is to be performed, I declare that what I claim is:

1. In a conventional bicycle, a power unit connected with the bicycle frame and disposed substantially below the axis of rotation of the pedal crankshaft and between the planes of rotation of the pedal cranks of the bicycle and comprising an internal combustion engine and a speed reduction gear connected with and extending substantially rearward from said engine, and a friction roller connected to and driven by said gear and being in frictional contact with the rear wheel of the bicycle.

2. In a conventional bicycle as defined in claim 1, said internal combustion engine having a substantially horizontal cylinder and a crank shaft disposed in the rear thereof and parallel to the axis of rotation of the pedal crankshaft, said speed reduction gear having a pinion attached to one end of said crank shaft and a spur gear wheel in mesh with said pinion, and said friction roller being connected with said spur gear wheel coaxially and laterally with respect thereto.

3. In a conventional bicycle as defined in claim 1, a compression spring connected with said engine and with the bicycle frame forward of the pedal crankshaft, and said reduction gear having a casing swingably connected with the bicycle frame behind the pedal crankshaft.

4. In a conventional bicycle, a power unit comprising an internal combustion engine disposed substantially below the axis of rotation of the pedal crankshaft and between the planes of rotation of the pedal cranks of the bicycle, a friction roller connected to and driven by said engine and being in frictional contact with the rear wheel of the bicycle, said unit having a portion swingably connected with the frame of the bicycle, and resilient means connected with another portion of said unit and with the frame of the bicycle and tending to swing said unit on said support means in a direction whereby said roller is pressed to the rear wheel of the bicycle.

5. In a conventional bicycle comprising a rear wheel, a lower rear and a lower front frame member, pedal cranks, and a pedal crankshaft: a power unit disposed beneath the pedal crankshaft and between the planes of rotation of the pedal cranks and comprising a motor, a speed reduction gear connected with said motor and comprising a friction roller in frictional contact with said rear wheel, a hinged support means connected with the lower rear frame member of the bicycle and with said unit, and resilient means connected with said lower front frame member and with said unit and adapted to urge said unit downward and away from said front frame member and to swing said unit on said support means in a direction whereby said roller is pressed to said wheel.

MARIO BENAZZOLI.

REFERENCES CITED

The following references are of record in the file of this patent:

UNITED STATES PATENTS

| Number | Name | Date |
|---|---|---|
| 928,928 | Belz | July 27, 1909 |
| 1,410,180 | Hildebrand | Mar. 21, 1922 |
| 2,091,698 | Anthony et al. | Aug. 31, 1937 |
| 2,274,043 | Cushman | Feb. 24, 1942 |

FOREIGN PATENTS

| Number | Country | Date |
|---|---|---|
| 180,327 | Great Britain | Oct. 26, 1922 |
| 556,908 | France | Apr. 23, 1923 |